(12) United States Patent
Liu

(10) Patent No.: US 10,591,999 B2
(45) Date of Patent: Mar. 17, 2020

(54) HAND GESTURE RECOGNITION METHOD, DEVICE, SYSTEM, AND COMPUTER STORAGE MEDIUM

(71) Applicant: ZTE Corporation, Shenzhen, Guangdong (CN)

(72) Inventor: Haijun Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/121,579

(22) PCT Filed: Oct. 22, 2014

(86) PCT No.: PCT/CN2014/089183
§ 371 (c)(1),
(2) Date: Aug. 25, 2016

(87) PCT Pub. No.: WO2015/127787
PCT Pub. Date: Sep. 3, 2015

(65) Prior Publication Data
US 2017/0262061 A1 Sep. 14, 2017

(30) Foreign Application Priority Data
Feb. 25, 2014 (CN) .......................... 2014 1 0065600

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/011* (2013.01); *G06F 3/0304* (2013.01); *H04N 5/4403* (2013.01); *H04N 21/4223* (2013.01)

(58) Field of Classification Search
CPC ............................ G06F 3/017; H04N 21/4223
See application file for complete search history.

(56) References Cited

U.S. PATENT DOCUMENTS

| | | | | |
|---|---|---|---|---|
| 2010/0199232 A1* | 8/2010 | Mistry | .................... | G06F 1/163 715/863 |
| 2011/0173574 A1* | 7/2011 | Clavin | .................... | G06F 3/017 715/863 |

(Continued)

FOREIGN PATENT DOCUMENTS

| | | |
|---|---|---|
| CN | 102307309 A | 1/2012 |
| CN | 102625173 A | 8/2012 |

(Continued)

OTHER PUBLICATIONS

Supplementary European Search Report in European application No. 14883845.1, dated Jan. 25, 2017, 9 pgs.
(Continued)

*Primary Examiner* — Alexander Eisen
*Assistant Examiner* — Kebede T Teshome
(74) *Attorney, Agent, or Firm* — Cantor Colburn LLP (57) ABSTRACT

The embodiments of the present invention disclose a hand gesture recognition method, device, system, and computer storage medium; a hand gesture recognition method disclosed in the present invention comprising: a hand gesture recognition device publishing in a network a list of supported hand gestures and/or a list of instructions corresponding to said supported hand gestures. Another hand gesture recognition method disclosed by the present invention comprises: a hand gesture recognition control device obtaining by means of a network a list of hand gestures supported by a hand gesture recognition device, and/or a list of instructions corresponding to said supported hand gestures.

15 Claims, 5 Drawing Sheets

(51) Int. Cl.
H04N 5/44 (2011.01)
H04N 21/4223 (2011.01)

(56) References Cited

U.S. PATENT DOCUMENTS

| | | | |
|---|---|---|---|
| 2012/0272194 | A1 | 10/2012 | Yang |
| 2013/0229508 | A1* | 9/2013 | Li ..................... G06F 1/3287 348/77 |
| 2013/0290911 | A1* | 10/2013 | Praphul ................ G06F 3/017 715/863 |

FOREIGN PATENT DOCUMENTS

| | | | |
|---|---|---|---|
| CN | 102662462 | A | 9/2012 |
| CN | 102722321 | A | 10/2012 |
| CN | 102799355 | A | 11/2012 |
| CN | 102866777 | A | 1/2013 |
| CN | 102929508 | A | 2/2013 |
| CN | 102932212 | A | 2/2013 |
| CN | 102968612 | A | 3/2013 |
| CN | 103093196 | A | 5/2013 |
| CN | 103208002 | A | 7/2013 |
| CN | 103294374 | A | 9/2013 |
| CN | 103303224 | A | 9/2013 |
| CN | 103329066 | A | 9/2013 |
| CN | 103345064 | A | 10/2013 |
| CN | 103442177 | A | 12/2013 |
| CN | 103455136 | A | 12/2013 |
| CN | 103488406 | A | 1/2014 |
| CN | 103543926 | A | 1/2014 |
| CN | 103576966 | A | 2/2014 |
| CN | 103577793 | A | 2/2014 |
| CN | 103677591 | A | 3/2014 |
| WO | 2012099584 | A1 | 7/2012 |

OTHER PUBLICATIONS

International Search Report in international application No. PCT/CN2014/089183, dated Jan. 28, 2015, 5 pgs.
English Translation of the Written Opinion of the International Search Authority in international application No. PCT/CN2014/089183, dated Jan. 28, 2015, 17 pgs.
UPnP Forum: "UPnP Device Architecture-1.1", Oct. 15, 2008. reprinted from the Internet at: https://www.npmjs.com/package/upnp_da11, 136 pgs.
UPnP DCP AV: "UPnP AV Architecture:2" Dec. 31, 2010, John Ritchie, Thomas Kuehnel, Wouter Van Der Beek and Jeffrey Kang, Reprinted from the Internet at: http://upnp.org/specs/av/UPnP-av-AVArchitecture-v2-20101231.pdf, 35 pgs.
"ConnectionManager:3 Service", Dec. 31, 2010, Alan Presser et al., Reprinted from the Internet at: http://www.upnp.org/specs/av/UPnP-av-ConnectionManager-v3-Service-20101231.pdf, 84 pgs.
"Text to Speech (v2)", Jan. 5, 2015, Wouter Van Der Beek, UPnP Forum, 10 pgs.
"UPnP AV Change Request: CR-101", Content Aggregation, Apr. 24, 2012, Seung R. Yang, AV v5, Version 0.17, 13 pgs.
"DLNA Networked Device Interoperability Guidelines", Apr. 11, 2012, Digital Living Network Alliance, 13 pgs.
"RVU Protocol Specification", Dec. 21, 2010, RVU Alliance, RVU Alliance Confidential, 242 pgs.
"Multicast DNS", Dec. 9, 2011, S. Cheshire and M. Krochmal, Internet Engineering Task Force, 72 pgs.
"Research on the Technology of Video-based Intelligent Scene Analysis and Human-Computer Interaction", Jan. 20, 2011, Chuanbo Weng, A Dissertation submitted to Zhejiang University for the Degree of Master of Engineering, Entire Document in Chinese w/Abstract in English, 77 pgs.
Research on video based human computer interaction and its key technologies, mailed in 2007, Entire Document in Chinese w/Abstract in English. 3 pgs.
"Hand Gesture Recognition Method in Complex Background", 2010, Entire Document in Chinese w/Abstract in English, 78 pgs.
"Gesture Recognition Based on Vision and its Application in Human Computer Interaction", May 11 2004, Entire Document in Chinese w/Abstract in English, 3 pgs.
"Recognition of Complex Dynamic Gesture Based on HMM-FNN Model", Sep. 2008, Wang Xi-Ying, Dai Guo-Chong, Zhang Xi-Wen and Chang Feng-Jung, Journal of Software, vol. 19, No. 9, Entire Document in Chinese w/Abstract in English, 11 pgs.
"Real-Time Gesture Recognition Based on AdaBoost Algorithm and Optical Flow Matching", Apr. 2012, Kai Wang, Hong-Yang Yu and Ping Zhang, Microelectronics & Computer, vol. 29, No. 4, Entire Document in Chinese w/ Abstract in English, 4 pgs.
"Media Control Interface Based on Gesture Recognition of Mobile Phone" Dec. 2010, Yue Ding, Jun Fe Liu, Yi Qiang Chen and Jing Ye Zhou, Computer Engineering, vol. 36, No. 23, Entire Document in Chinese w/ Abstract in English, 3 pgs.
"The Application of Fourier Descriptors to the Recognition of Alphabet Gesture", Jun. 2005, Ge Yuan, Gue Xingwei and Wang Lingquan, Computer Applications and Software, vol. 22, No. 6, Entire Document in Chinese w/Abstract in English, 3 pgs.
"Hand Gesture Recognition Technology and its Application in Human Computer Interaction", Aug. 2002, China Academic Journal Electronic Publishing House, Entire Document in Chinese w/Abstract in English, 5 pgs.
"Interaction Gesture Analysis Based on Touch Screen" Apr. 2011. Li Wen-Sheng, Deng Chun-Jian and L Yi, Chinese Journal of Liquid Crystals and Displays, vol. 26, No. 2, Entire Document in Chinese w/Abstract in English, 6 pgs.
"Gesture Flow: Streaming Gestures to an Audience", 2011, Yuan Feng, Zimu Liu and Baochon Li, IEEE INFOCOM, Entire Document in Chinese w/Abstract in English, pp. 748-756.
"Vision Based Human-Machine Interface via Hand Gestures", 2007, Norbert Berci and Peter Szolgay, IEEE 18th European Conference on Circuit Theory and Design, pp. 496-499.
"Long-range Touch Gesture Interface for Smart TV", Jun. 2011, Dehyung Kim, Woo-Han Yun, Jaeyeon Lee, Jaehong Kim and Joochan Sohn, IEEE, 6th International Conference on Computer Sciences and Convergence Information Technology, pp. 257-259.

* cited by examiner

Fig. 1

> A gesture recognition device publishes, in a network, a list of supported gestures and/or a list of instructions corresponding to the supported gestures

Fig. 2

> A gesture recognition control device obtains, through a network, a list of gestures supported by a hand gesture recognition device and/or a list of instructions corresponding to the supported gestures

HAND GESTURE RECOGNITION METHOD, DEVICE, SYSTEM, AND COMPUTER STORAGE MEDIUM

TECHNICAL FIELD

The disclosure relates to recognition techniques in the field of communications and information, and particularly to gesture recognition methods and devices, a gesture recognition system and a computer storage medium.

BACKGROUND

With the development of digital multimedia and networks, entertainment experiences of users in daily life are enriched. Existing techniques enable users at home to enjoy high-definition TV programs from a digital optical disk, a cable television, the Internet and the like. Stereo, 5.1 acoustic channel, 7.1 acoustic channel and even more vivid sound effect may be experienced. Moreover, the users are able to implement these experiences by using tablet electronic devices and mobile phones. The related art also includes that a user is able to transfer a digital content between different devices through a network so as to play the transferred digital content, and to control playing on a device through a remote control or a gesture, e.g. the user is able to control to switch to a program of a previous channel or a next channel and so on.

In the related art, for controlling multiple devices, generally each device has a respective remote controller to perform control, but these remote controllers are not universal, and most of these controllers for devices such as a traditional TV set or sound box, are not network enabled. There may be some network enabled remote controls, e.g., a device (e.g., a mobile phone, a pad) having computing and networking capabilities can be loaded with software supporting intercommunication protocols to control another device.

With the development of techniques, there are increasing demands for sharing and transferring content being played between multiple devices, and the manipulation methods above don't seem convenient enough. For example, a user needs to select a remote control corresponding to a specific device from a number of remote controllers and change remote controls from time to time to control different devices, the device may be controlled through operations on a pad or a mobile phone by people familiar with basic operations on computers, or a single device is controlled by a simple gesture. Usually, in order to use different devices, it is necessary to learn to use different manipulation tools.

At present, gesture control is a relatively novel manipulation technology. A camera on a device monitors a gesture, analyzes and recognizes the monitored gesture, converts the recognized gesture into control instructions for the device; or a user uses a wearable device, and wears a device like a ring, a watch, a vest and the like on a hand, an arm and the body to recognize an action of the user, so as to realize the control of the device.

The related art and some products enable a user to use a gesture to manipulate a device. For example, a camera is added on a television so as to acquire and recognize a gesture of people, and then the television is manipulated by the gesture according to predefined correspondences between gestures and operation commands. Achieved manipulations include a change of a channel, a change of a volume and so on.

Such gesture recognition techniques and related products require that a manipulated device is provided with a camera (in the case of computer vision recognition). At present, there may be devices without a camera in some environments, such as a home environment, due to reasons such as device sizes and cost. However, it is expected that these devices may also be operated by a user through gestures and it is expected that additional cameras transmit gesture information to the devices, so that a user can use gestures to control the devices. Another method is that a wearable device is used with another device after being matched and connected with the latter. Usually, wearable devices and other devices are connected one by one before being used.

There have been related techniques capable of implementing mutual discovery and control between devices by transmission of control information between the devices through a network. For example, a Universal Plug and Play (UPnP) technique specifies how to implement discovery and control between devices by sending and receiving network messages. The technique uses a network address and a digital code as a device identifier which is a machine identifier, and the final control needs to be operated after a user makes a selection according to the machine identifier.

To sum up, at present, there is no effective solution in the related art yet for helping a user to control more devices within a relatively small range through an easier and more natural operation so that the user does not need to learn to master more usage methods, and costs of enterprise production and user consumption can be decreased.

SUMMARY

Embodiments of the disclosure provide gesture recognition methods and devices, a gesture recognition system and a computer storage medium, so that a device without a gesture recognition capability can be controlled rapidly and conveniently according to a published list of supported gestures and/or a list of instructions corresponding to the supported gestures.

An embodiment of the disclosure provides a gesture recognition method, including:

a gesture recognition device publishes, in a network, a list of supported gestures and/or a list of instructions corresponding to the supported gestures.

An embodiment of the disclosure further provides a gesture recognition method, including:

a gesture recognition control device obtains, through a network, a list of gestures supported by a gesture recognition device and/or a list of instructions corresponding to the supported gestures.

An embodiment of the disclosure further provides a gesture recognition device, including:

a publishing unit configured to publish, in a network, a list of supported gestures and/or a list of instructions corresponding to the supported gestures.

An embodiment of the disclosure further provides a gesture recognition control device, including:

a transceiver unit configured to obtain, through a network, a list of gestures supported by a gesture recognition device and/or a list of instructions corresponding to the supported gestures.

An embodiment of the disclosure further provides a gesture recognition system, including: the gesture recognition device, and/or the gesture recognition control device.

An embodiment of the disclosure further provides a computer storage medium having stored therein computer executable instructions used for executing any one of the gesture recognition methods above.

According to the technical solutions of the embodiments of the disclosure, since a list of supported gestures and/or a list of instructions corresponding to the supported gestures are/is published in a network, a user may be helped to control devices, including a device without a visual recognition capability, within a relatively small range by using a simpler and more natural operation. The user can rapidly and conveniently control multiple devices without learning to master control and usage methods of the devices. Moreover, costs of enterprise production and consumer consumption can be lowered.

DETAILED DESCRIPTION

The disclosure will be further elaborated hereinafter with reference to the accompanying drawings and embodiments.

Figure 1:
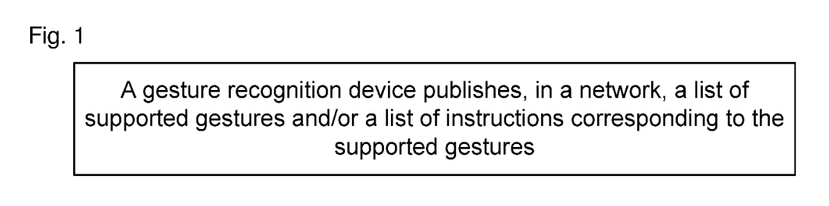
FIG. 1 is a first schematic diagram showing a gesture recognition method according to an embodiment of the disclosure.

An embodiment of the disclosure recites a gesture recognition method. As shown in FIG. 1, a gesture recognition device publishes, in a network, a list of supported gestures and/or a list of instructions corresponding to the supported gestures.

It needs to be pointed out that the gesture recognition device is arranged in a device to be manipulated. The device to be manipulated may be any conventional device and does not need to have a visual recognition capability. An example of the list of the gestures includes: 1 refers to extending one finger; 2 refers to extending two fingers; 10 refers to extending a fist. An example of the list of the instructions corresponding to the supported gestures includes: 1 refers to extending one finger, which corresponds to a start instruction; 2 refers to extending two fingers, which corresponds to an end instruction; 10 refers to extending a fist, which corresponds to a power-off instruction. The same list may be preset for different devices to be manipulated, and different lists may be also preset.

In an implementation, the gesture recognition device further receives an acquired gesture; and executes an instruction corresponding to the acquired gesture, or forwards the acquired gesture.

The gesture recognition device executes the instruction so as to control (such as start and end) the device to be manipulated where the gesture recognition device is located. The gesture recognition device may also only publish the acquired gesture. In other words, a gesture recognition control device is responsible for acquiring the gestures, so that the gesture recognition device can receive the gesture published by the gesture recognition control device. The gesture here is represented by computer image data, including characteristic data of an image. When receiving the gesture, the gesture recognition device determines an instruction corresponding to the received gesture, and executes the determined instruction so as to control the device to be manipulated where the gesture recognition device is located.

Since there may be a plurality of devices to be manipulated in some application scenarios, accordingly, a gesture recognition device is arranged in each device to be manipulated. Since each gesture recognition device may support different gestures, when receiving an acquired gesture, the gesture recognition device firstly needs to determine whether the received gesture is supported. Accordingly, in an implementation, the step that the instruction corresponding to the acquired gesture is executed and the acquired gesture is forwarded includes that:

when the gesture recognition device determines that the acquired gesture is supported, the instruction corresponding to the acquired gesture is determined and the determined instruction is executed; and the gesture recognition device forwards the acquired gesture according to a preset strategy. Here, the forwarding may be implemented by sending a message in the network, or by a communication interface between gesture recognition devices. The message sent in the network includes multicast, broadcast and unicast messages. The preset strategy includes at least one of the following strategies: when the acquired gesture received is a preset specific gesture, the acquired gesture is forwarded; and when the acquired gesture is not supported, the acquired gesture is forwarded.

In an implementation, the gesture recognition device further receives the acquired gesture, determines an instruction corresponding to the acquired gesture, and executes the determined instruction; or the gesture recognition device further receives an instruction corresponding to the acquired gesture, and executes the instruction.

In the present embodiment, the acquired gesture received by the gesture recognition device is a gesture supported by the gesture recognition device. Therefore, it is only necessary to directly determine the instruction corresponding to the received gesture and execute the same.

In an implementation, the step that the gesture recognition device publishes the list of the supported gestures and/or the list of the instructions corresponding to the supported gestures includes that:

the gesture recognition device publishes, in the network, the list of the supported gestures and/or the list of the instructions corresponding to the supported gestures; or upon reception of a request message for querying a gesture recognition capability, the gesture recognition device publishes, in the network, the list of the supported gestures and/or the list of the instructions corresponding to the supported gestures. For example, the list/lists may be published in the network in a form of a unicast, multicast or broadcast message.

Herein, the gesture recognition device may publish the list of the supported gestures, and/or the list of the instructions corresponding to the supported gestures periodically, and may also publish the same in a non-periodical manner. The list of the gestures includes at least one of the following information: gesture numbers, gesture text description information, and digital graphic information. The gesture recognition device may be arranged in the device to be manipulated, and recognizes the gesture by using a visual recognition capability of the gesture recognition device, or the gesture recognition device may also function as a wearable device to recognize the gesture. Accordingly, the gesture includes: a computer vision recognition gesture and a wearable device gesture.

Figure 2:
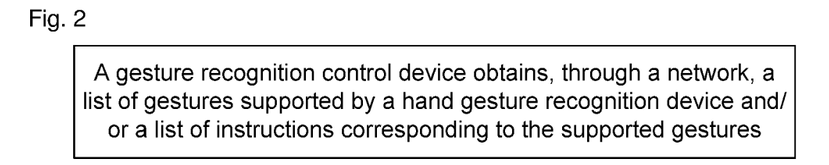
FIG. 2 is a second schematic diagram showing a gesture recognition method according to an embodiment of the disclosure.

An embodiment of the disclosure further recites a gesture recognition method. As shown in FIG. 2, a gesture recognition control device obtains, through a network, a list of gestures supported by a gesture recognition device, and/or a list of instructions corresponding to the supported gestures.

Herein, the gesture recognition device is arranged in a device to be manipulated; the gesture recognition device-published list of the supported gestures, and/or the list of the instruction corresponding to the supported gestures correspond/corresponds to the device to be manipulated where the gesture recognition device is located.

In an implementation, the gesture recognition control device acquires a gesture and sends the acquired gesture to a gesture recognition device so that the gesture recognition device can receive the acquired gesture.

When determining that the acquired gesture is a gesture supported by the gesture recognition device, the gesture recognition device determines an instruction corresponding to the acquired gesture; and executes the determined instruction.

In an implementation, the gesture recognition control device further acquires the gesture; and the gesture recognition control device determines, according to at least one of the following information: a list of gestures supported by the gesture recognition device, a direction of the acquired gesture, and intention information of the acquired gesture, a gesture recognition device supporting the acquired gesture, and sends the acquired gesture to the determined gesture recognition device, so as to enable the gesture recognition device to receive the acquired gesture, determine an instruction corresponding to the acquired gesture, and execute the determined instruction. For example, when a target gesture recognition device (the gesture recognition device supporting the acquired gesture) is determined according to the direction of the acquired gesture, the position of the target gesture recognition device corresponds to the direction of the acquired gesture and the intention information of the acquired gesture includes the target gesture recognition device of the acquired gesture. The intention information may be obtained by recognizing and analyzing the acquired gesture.

Or, the gesture recognition control device determines, according to at least one of the following information: a list of instructions corresponding to gestures supported by a gesture recognition device, a direction of the acquired gesture, and intention information of the acquired gesture, a gesture recognition device supporting the acquired gesture, determines an instruction corresponding to the determined gesture recognition device, and sends the determined instruction to the corresponding gesture recognition device, so as to enable the gesture recognition device to receive the instruction corresponding to the acquired gesture, and execute the instruction.

In an implementation, the gesture recognition control device receives, through the network, the gesture recognition device-published list of the supported gestures, and/or the list of the instructions corresponding to the supported gestures;

or the gesture recognition control device sends, through the network, a gesture recognition capability request message to the gesture recognition device, so as to receive the gesture recognition device-published list of the supported gestures, and the list of the instructions corresponding to the supported gestures.

The list of the gestures includes at least one of the following information: gesture numbers, gesture text description information, and digital graphic information, and the gesture includes: a computer vision recognition gesture and a wearable device gesture.

An embodiment of the disclosure further recites a computer readable medium. The computer readable medium stores a computer program. The computer program is used for executing the gesture recognition method as shown in FIG. 1 or FIG. 2.

Figure 3:
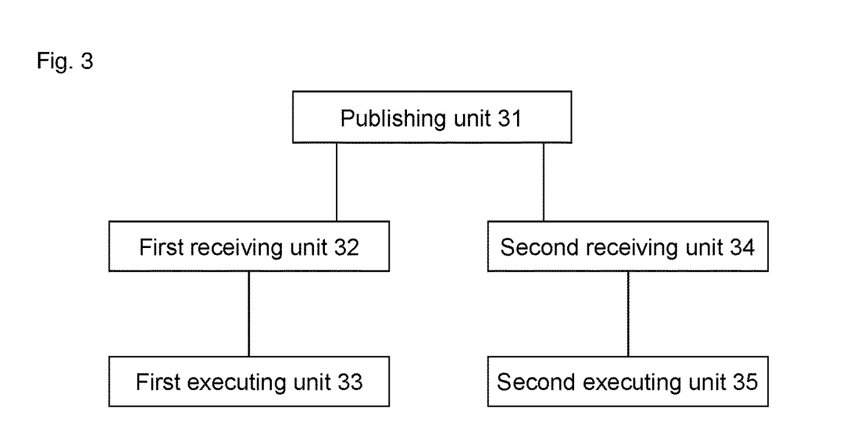
FIG. 3 is a schematic diagram showing components of a gesture recognition device according to an embodiment of the disclosure.

An embodiment of the disclosure recites a gesture recognition device. As shown in FIG. 3, the gesture recognition device includes:

a publishing unit 31 configured to publish, in a network, a list of supported gestures and/or a list of instructions corresponding to the supported gestures.

Herein, the gesture recognition device further includes:

a first receiving unit 32 configured to receive an acquired gesture; and a first executing unit 33 configured to execute an instruction corresponding to the acquired gesture, or trigger the publishing unit to forward the acquired gesture.

Herein, the first executing unit 33 is further configured to, when it is determined that the acquired gesture is supported, determine the instruction corresponding to the acquired gesture and execute the determined instruction; or according to a preset strategy, trigger the publishing unit 31 to forward the acquired gesture.

Herein, the gesture recognition device further includes: a second receiving unit 34 and a second executing unit 35, in which:

the second receiving unit 34 is configured to receive the acquired gesture, or receive an instruction corresponding to the acquired gesture; and the second executing unit 35 is configured to determine an instruction corresponding to the acquired gesture, and execute the determined instruction; or execute the instruction corresponding to the acquired gesture received by the second receiving unit 34.

Herein, the publishing unit 31 is further configured to publish, in a form of a message in the network, the list of the supported gestures, and/or the list of the instructions corresponding to the supported gestures;

or publish, in a form of a message in the network, after receiving a request message for querying a gesture recognition capability, the list of the supported gestures, and/or the list of the instructions corresponding to the supported gestures.

Herein, the list of the gestures includes at least one of the following information: gesture numbers, gesture text description information, and digital graphic information.

Herein, the gesture includes: a computer vision recognition gesture and a wearable device gesture.

The publishing unit 31, the first receiving unit 32, the first executing unit 33, the second receiving unit 34, and the second executing unit 35 may be implemented by a Central Processing Unit (CPU), a Digital Signal Processor (DSP) or a Field Programmable Gate Array (FPGA) in the gesture recognition device.

Figure 4A:
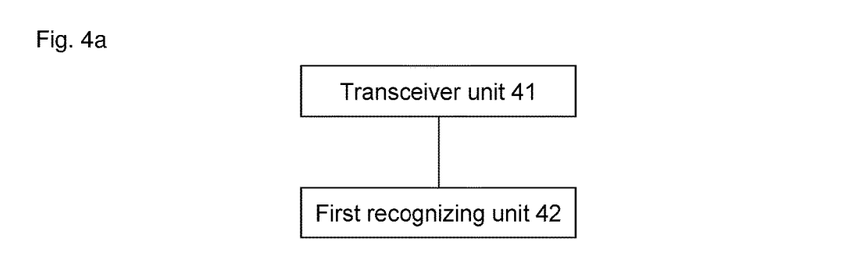
FIG. 4a is a first schematic diagram showing components of a gesture recognition control device according to an embodiment of the disclosure.

An embodiment of the disclosure further recites a gesture recognition control device. As shown in FIG. 4a, the gesture recognition control device includes:

a transceiver unit 41 configured to obtain, through a network, a list of gestures supported by a gesture recognition device, and/or a list of instructions corresponding to the supported gestures; and a first recognizing unit 42 configured to acquire a gesture and send the acquired gesture to the gesture recognition device.

Figure 4B:
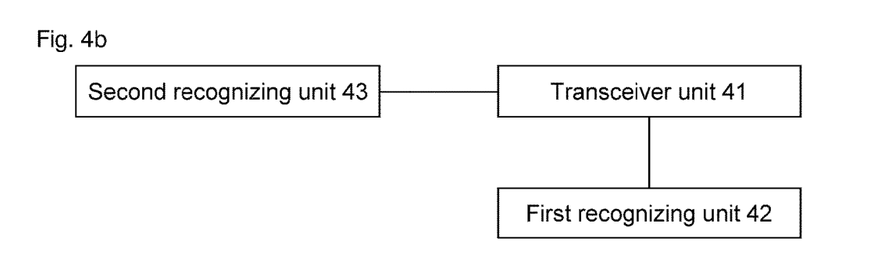
FIG. 4b is a second schematic diagram showing components of a gesture recognition control device according to an embodiment of the disclosure.
Figure 4C:
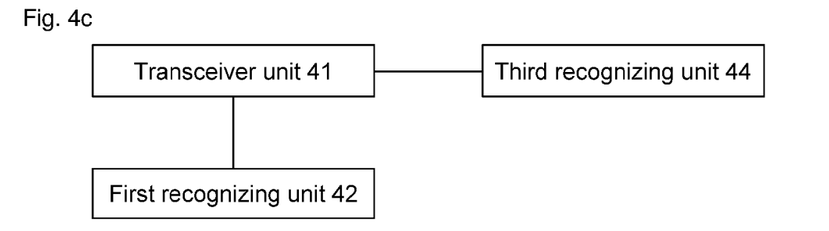
FIG. 4c is a third schematic diagram showing components of a gesture recognition control device according to an embodiment of the disclosure.

Herein, as shown in FIG. 4b and FIG. 4c, based on the gesture recognition device as shown in FIG. 4a, the gesture recognition control device may further include: a second recognizing unit 43 and a third recognizing unit 44, in which:

the second recognizing unit 43 is configure to acquire the gesture; and determine a gesture recognition device supporting the acquired gesture;

the transceiver unit 41 is further configured to send the acquired gesture to the gesture recognition device determined by the second recognizing unit 43; or the third recognizing unit 44 is configured to determine a gesture recognizing device supporting the acquired gesture, and determine an instruction corresponding to the determined gesture recognition device; and the transceiver unit 41 is further configured to send the instruction determined by the third recognizing unit 44 to the corresponding gesture recognition device.

Herein, the transceiver unit 41 is further configured to receive, through the network, the gesture recognition device-published list of the supported gestures, and/or the list of the instructions corresponding to the supported gestures; or send, through the network, a gesture recognition capability request message to the gesture recognition device, so as to receive the gesture recognition device-published list of the supported gestures, and the list of the instructions corresponding to the supported gestures.

Herein, the list of the gestures includes at least one of the following information: gesture numbers, gesture text description information, and digital graphic information.

Herein, the gesture includes: a computer vision recognition gesture and a wearable device gesture.

The transceiver unit 41, the first recognizing unit 42, the second recognizing unit 43 and the third recognizing unit 44 may be implemented by a CPU, a DSP, or an FPGA in the gesture recognition device.

An embodiment of the disclosure further recites a gesture recognition system. The gesture recognition system includes the gesture recognition device as shown in FIG. 3, and/or the gesture recognition control device as shown in any accompanying drawings of FIG. 4a to FIG. 4c. It needs to be noted that a device included by the system may be arranged on a single device, and may be also arranged on a plurality of devices.

Figure 5A:
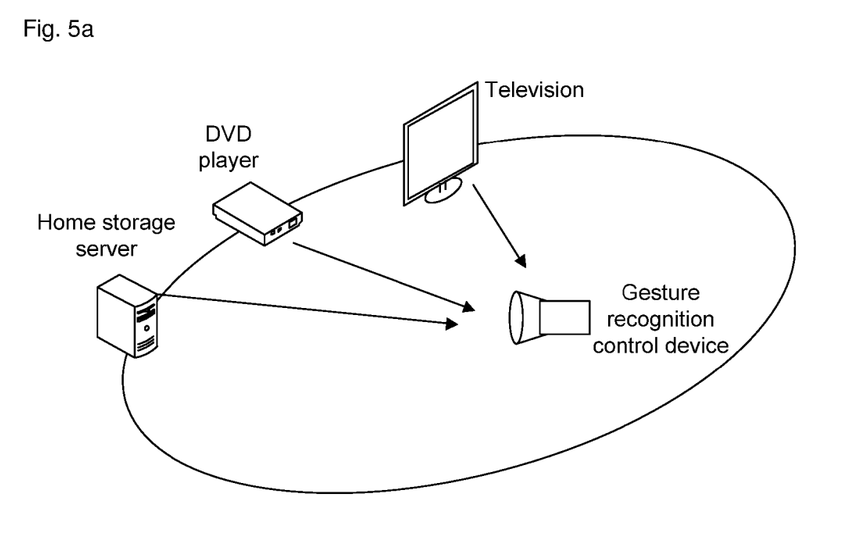
FIG. 5a is a schematic diagram of a scenario in an embodiment of the disclosure.

A method recorded in an embodiment of the disclosure will be further described below in combination with a specific use scenario. FIG. 5a is a schematic diagram of a scenario in an embodiment of the disclosure. Four devices as shown in FIG. 5a are a gesture recognition control device, a television, a Digital Versatile Disc (DVD) player, and a home storage server, respectively, herein the television and the home storage server support gesture control, but are not provided with a camera to support recognition of a gesture. To facilitate description, the DVD player does not support gesture control, and can be only controlled by a traditional remote control.

The four devices are provided with a network interface, e.g. supporting Electrical and Electronics Engineers (IEEE) 802.11b/g/n or IEEE 802.3, so that they may be connected to an Internet Protocol (IP) network. Any one of the four devices may communicate with other devices, and process a manipulation instruction or transfer the manipulation instruction.

Capabilities of the four devices, including mutual discovery, connection, as well as transmission and reception of a message on a network, may be implemented by using a related UPnP technology, and may be also implemented by a multicast Domain Name System (mDNS), or a DNS-based Service Discovery (DNS-SD) technology. Such technologies are applied in the IP network, use a unicast or multicast query method, respond to a query according to a predefined message format, and provide function invoking. For example, the UPnP technology specifies a method for a media display device (e.g. the television), or a server (e.g. the DVD player or the home storage server) to respond to a query and invoking functions that are provided.

The gesture recognition control device acquires an image or a video through a camera, measures the distance through infrared so as to recognize the image, and may further implement functions including storage and control of data, and a network service.

In an embodiment of the disclosure, the gesture recognition control device may be also a wearable device, such as a ring type device worn on a hand or a watch type device worn on an arm. Such a wearable device may recognize an action of a finger and an arm of a user and also has a network function.

In an embodiment of the disclosure, the gesture recognition control device is able to recognize a device to be manipulated within a visual range of the gesture recognition control device, so as to recognize a direction of an acquired gesture, or a gesture intention of the acquired gesture, so that a target gesture recognition device can be determined, so as to send the acquired gesture, or an instruction corresponding to the acquired gesture, to the target gesture recognition device. In an implementation, the gesture recognition control device rotates in a three-dimensional space to acquire an image by using a camera or infrared distance measurement, and analyzes and searches a predefined tag graph in the acquired image to perform analysis. Here, the predefined tag graph may be an image, or a graph pre-stored in the gesture recognition control device, and may be also a received image or a graph sent by a gesture recognition device in the device to be manipulated. After analyzing the tag graph, the gesture recognition control device recognizes a tag (such as a two-dimensional code, or a text identifying an address, a name and a space position of a device), measures the position of the device to be manipulated corresponding to the tag, and stores the position and an identifier of the device to be manipulated.

In an embodiment of the disclosure, the gesture recognition control device further receives characteristic images sent by devices to be manipulated including the television, the DVD player, the home storage server and so on, such as data of device pictures in various angles, and finally retrieves data of the pictures of the devices to be manipulated from a captured panoramic picture, and measures and records the positions of the devices to be manipulated. The operation of retrieving and measuring the devices to be manipulated from the picture data may be implemented by technologies including characteristic detection and matching in computer vision. Therefore, the gesture recognition control device can recognize devices to be manipulated in a visual range of the gesture recognition control device so as to determine a gesture recognition device to which an gesture or an instruction corresponding to the gesture is sent.

In an embodiment of the disclosure, when a device to be manipulated, including the television, or home storage server and so on are turned on, a gesture recognition device in the device to be manipulated sends a message by a multicast method. The message includes:

a unique identifier of the gesture recognition device, such as a network address, or an identifier different from the network address, such as a character string and so on.

The numbers of gestures supported by the gesture recognition device include, for example, 1 representing that 5 fingers are opened, 2 representing 2 fingers, 10 representing a fist, 20 representing waving of an arm and so on.

Control instructions corresponding to the gestures supported by the gesture recognition device include, for example, 1 representing power-on, 10 representing power-off and so on.

The message may further include: gesture parameters of the gestures supported by the gesture recognition device, such as a duration of a gesture action.

Figure 5B:
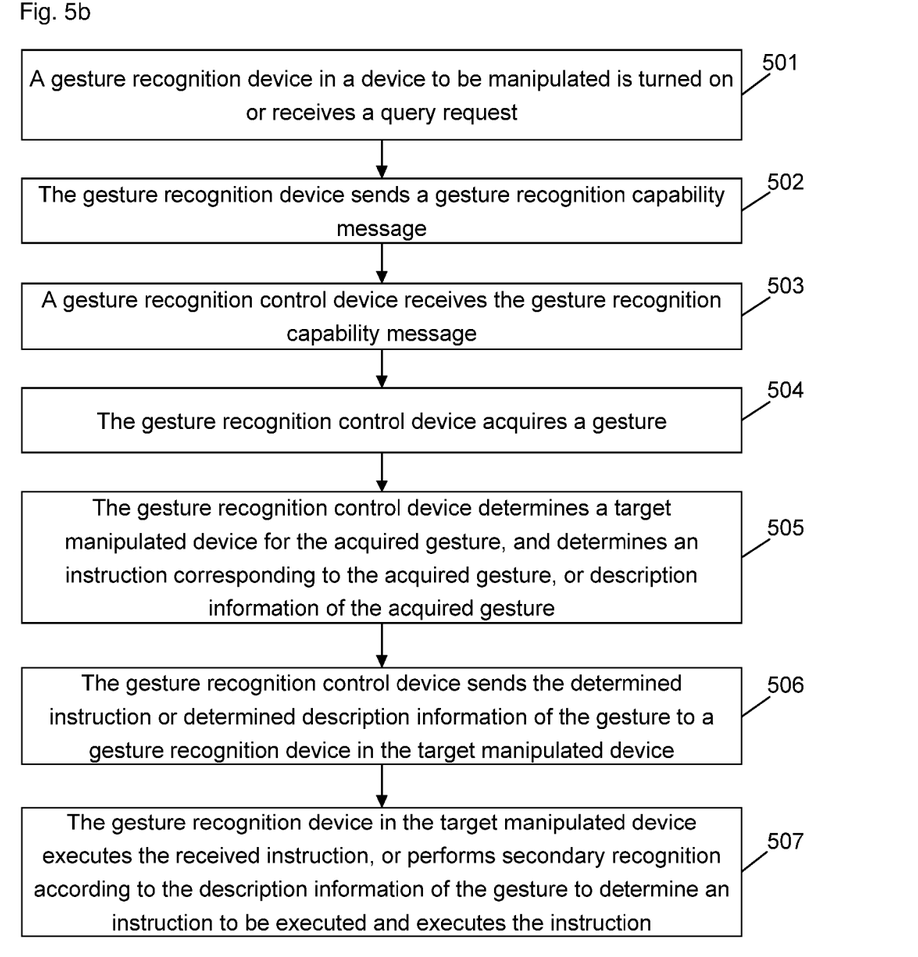
FIG. 5b is a flow chart showing work flow of a gesture recognition device and a gesture recognition control device according to an embodiment of the disclosure.

FIG. 5*b* is a diagram of a working flow of a gesture recognition device and a gesture recognition control device in an embodiment of the disclosure. As shown in FIG. 5*b*, the working flow includes the following steps.

Step 501: a gesture recognition device in a device to be manipulated is turned on or receives a query request.

Step 502: the gesture recognition device sends a gesture recognition capability message.

The gesture recognition capability message includes description information of a group of gestures, e.g. a list of instructions corresponding to supported gestures, or a list of the supported gesture. Description information of the gestures in the list of the gestures includes: gesture numbers, text description information, or digital graphic information (e.g. characteristic images) of the gestures.

The gesture recognition device may initiatively send the gesture recognition capability message in a form of a broadcast or multicast message, and may also send the gesture recognition capability message in a form of a broadcast or multicast message when receiving a query message for querying whether the device to be manipulated supports visual recognition.

Step 503: a gesture recognition control device receives the gesture recognition capability message.

Step 504: the gesture recognition control device acquires a gesture.

Here, the acquisition may include that the gesture is analyzed and recognized by a computer vision method, e.g. image data of the gesture is captured by a camera, and may also include that the gesture is analyzed and recognized by acquiring motion data of the gesture with a wearable device.

Step 505: the gesture recognition control device determines a target manipulated device for the acquired gesture, and determines an instruction corresponding to the acquired gesture, or description information of the acquired gesture.

After acquiring the gesture, the gesture recognition control device determines a target manipulated device for the acquired gesture. In other words, the gesture recognition control device determines a device to be manipulated to be controlled by the acquired gesture. The gesture recognition control device determines, according to at least one of the following information: a list of gestures supported by the gesture recognition device, a direction of the acquired gesture, and intention information of the acquired gesture, a gesture recognition device (arranged in the target manipulated device) supporting the acquired gesture, and when the target manipulated device for the acquired gesture is determined, determines, according to the gesture recognition capability message sent by the gesture recognition device in the target manipulated device in Step 503, an instruction corresponding to the acquired gesture or description information of the gesture, e.g. a characteristic image of the gesture.

Step 506: the gesture recognition device sends the determined instruction or determined description information of the gesture to the gesture recognition device in the target manipulated device.

Step 507: the gesture recognition device in the target manipulated device executes the received instruction, or performs secondary recognition according to the description information of the gesture to determine an instruction to be executed and executes the instruction.

A device where the gesture recognition control device is located responds to the received instruction so as to control the device by the gesture.

In the present embodiment, a plurality of gesture recognition devices of a user may be prevented from being operated erroneously according to a gesture implemented by the user. For example, when gesture recognition devices in a plurality of devices support the same gesture (corresponding to a power-off instruction) while the real intention of the user is to turn off only one device, thus a target gesture manipulated device is determined in the steps above, so as to prevent a wrong response to the gesture implemented by the user.

Figure 6:
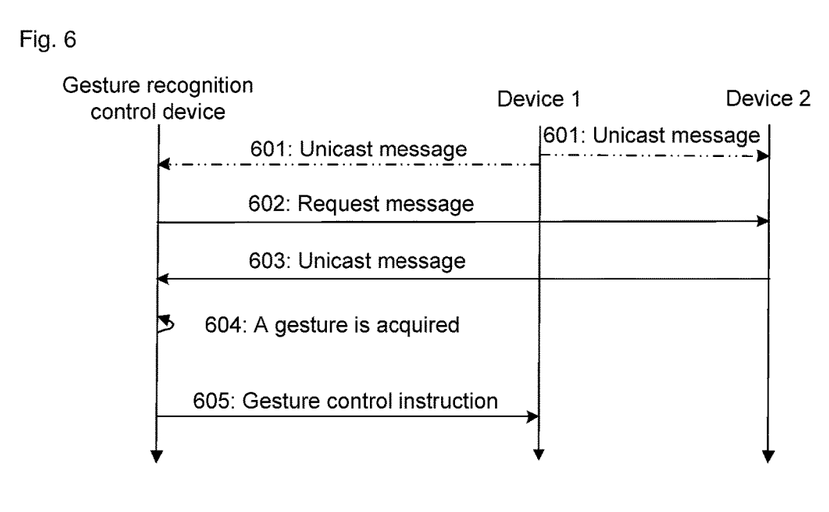
FIG. 6 is a schematic diagram showing message interaction during gesture control according to an embodiment of the disclosure.

FIG. 6 is a schematic diagram of message interaction during gesture control in an embodiment of the disclosure. The gesture recognition device above is arranged in device 1 and device 2, respectively, and the gesture recognition control device above is arranged in a gesture recognition control device. As shown in FIG. 6, the following steps are included.

Step 601: device 1 sends a multicast message.

The multicast message includes a list of instructions corresponding to gestures supported by device 1.

Thus, a gesture recognition control device in a network receives the list of the instructions corresponding to the gestures supported by device 1.

Step 602: the gesture recognition control device sends to device 2, a request message for querying a gesture recognition capability.

The message sent in Step 602 is also sent in a form of a broadcast, multicast, or unicast message.

Step 603: device 2 sends a unicast message.

The unicast message includes a list of instructions corresponding to gestures supported by device 2.

Step 604: the gesture recognition control device acquires a gesture.

Step 605: the gesture recognition control device sends a gesture control instruction to device 1.

The control command is sent because the user gesture acquired by the gesture recognition control device in Step 604 is to manipulate device 1, and to determine that device 1 supports the acquired gesture.

In this way, device 1 still supports gesture control without components including a camera, a wearable device and so on.

Herein, the device 1 and device 2 may be devices to be manipulated including a television, a player, a storage server and so on. However, the devices to be manipulated in the embodiments of the disclosure are not merely limited to the aforementioned devices. Other devices, such as a computer, a stereo, a loudspeaker box, a projector and a set top box may function as devices to be manipulated, even other industrial devices, such as an automobile, a machine tool, a steamer may be manipulated by a gesture recognition control device recorded by an embodiment of the disclosure.

In the embodiments above, a camera of a gesture recognition device may be of various specifications. For example, the camera may have a fixed focal length or a variable focal length, may have rotation spaces in various angles including upward, downward, leftward and rightward angles, or only supports a left angle and a right angle, needs to be configured with only one camera, and has various capabilities described in the embodiments. When the gesture recognition device recognizes the position of a gesture, an infrared laser may be used, or lights of other wavebands may be also used. Of course, a distance may be also calculated and measured by using 3 cameras, or the position of the recognized gesture is determined by using more than 3 cameras according to a weighting adjustment method.

The flows above are embodiments for implementing the disclosure, but the disclosure is not limited to be implemented by the embodiments above. In the embodiments, methods executed by specific flows are also not limited. The embodiments of the disclosure may be also implemented by similar methods. For example, a device is replaced by a unit, the names and types and so on of various messages recorded in the embodiments of the disclosure are changed, and they are only changes of name forms, and still belong to the protection scope of the disclosure.

For clarity, not all common features of the devices are shown and described in the embodiments of the disclosure. Of course, it should be understood that during the development of any actual device, it is necessary to make decisions of specific implementations so as to achieve specific purposes of developers, e.g. to meet constraints related to applications and services. These specific purposes change with different implementations and different developers. Moreover, it should be understood that such development work is complicated and time-consuming. However, even so, the technical work performed is regular for those of ordinary skill in the art under the inspiration of the content disclosed by the embodiments of the disclosure.

According to the topics described here, various types of operation systems, computer platforms, computer programs, and/or general machines can be used to fabricate, operate and/or execute various components, systems, devices, processing steps and/or data structures. Besides, it will be understood by those of ordinary skill in the art that devices which are not general can be also used without departing from the scope and spirit essence of the inventive concept disclosed herein, wherein a method is executed by a computer, a device or a machine, and the method can be stored as machine-readable instructions which can be stored on a determined medium, such as a computer storage device, including, but not limited to a Read Only Memory (ROM) (such as an ROM, a flash memory, and a transfer apparatus), a magnetic storage medium (such as a magnetic tape, and a magnetic driver), an optical storage medium (such as Compact Disc ROM (CD-ROM), a DVD-ROM, a paper card, and a paper tape) and other familiar types of program memories. Besides, it should be realized that the method can be executed by a human operator by choosing a software tool without human or creative judgment.

The embodiments above are applicable to, in a network-related manner, a Internet Protocol (IP) network supported by a communication network based on IEEE 802.3, IEEE 802.11b/g/n, a power line, a cable, a Public Switched Telephone Network (PSTN), a $3^{rd}$ Generation Partnership Project (3GPP) network, a 3GPP2 network and so on. Operating systems of various devices are applicable a UNIX operating system, a WINDOWS operating system, an ANDROID operating system, an IOS operating system, and an consumer-oriented interface is applicable to a JAVA language interface and so on.

In should be understood in several embodiments provided by the disclosure that the disclosed devices and methods may be implemented by other methods, and the embodiments of devices described above are only schematic. For example, the division of the units is only division of logical functions, and there may be additional division methods in practical implementation. For example, multiple units or components may be combined or may be integrated to another system, or some features may be omitted or not performed. Besides, coupling, direct coupling or communication connection between the displayed or discussed components may be indirect coupling or communication connection of the devices or units through some interfaces, devices or units, and may be electrical, mechanical or other forms.

The units described as separate components may be or may be also not physically separate, and components displayed as units may be or may be also not physical units. That is, the components may be located at the same place or may be distributed on multiple network units. Some or all of the units may be selected to achieve the purposes of the solutions of the embodiments as needed.

In addition, the functional units according to the embodiments of the disclosure may be integrated in one processing unit, or each of the units may function as a unit separately, or two or more units may be integrated in one unit. The integrated unit may be implemented by applying a form of hardware, and may be also implemented by applying a form of hardware and software functional units.

Those of ordinary skill in the art may understand that all or some steps for implementing the embodiments of the methods may be completed by related hardware instructed by a program. The program may be stored in a computer readable storage medium. When executed, the problem executes steps including the method embodiments above, and the storage medium includes various media that can store a program code, such as a mobile storage device, an ROM, and a magnetic disk, an optical disk, or, when implemented in a form of a software functional module, and sold or used as an independent product, the integrated unit of the disclosure may be stored in a computer readable storage medium. Based on such understanding, the technical solutions of the embodiments of the disclosure essentially, or parts of the technical solutions contributing to the traditional art may be represented in a form of a software product. The computer software product is stored in a storage medium, including some instructions enabling a computer device (which may be a personal computer, a server, a network device, or the like) to perform all or some steps of the methods according to the embodiments of the disclosure. The above storage medium includes various media which may store a program code, such as a Universal Serial Bus (USB) disk, an ROM, a magnetic disk or an optical disk and so on.

What are described above are only specific embodiments of the disclosure, and the protection scope of the disclosure is not limited thereto. Any changes or replacements that may be easily thought of by those skilled in the art within the technical scope disclosed by the disclosure should be covered in the protection scope of the disclosure. Therefore, the protection scope of the disclosure should be subject to the protection scope of the claims.

What is claimed is:

1. A gesture recognition method, applied to a gesture device supporting gesture control that is not provided with a camera to support recognition of a gesture, comprising:
    publishing, in a network, by the gesture device, information of gestures supported by the gesture device in a form of a unicast, multicast or broadcast message, wherein the information of gestures supported by the gesture device comprises at least one of a list of supported gestures or a list of instructions corresponding to supported gestures;
    receiving, by the gesture device, a gesture acquired by a gesture recognition control device positioned independently of the gesture device and sent to the gesture device according to at least one of the following information: the information of gestures supported by the gesture device, a direction of the acquired gesture or intention information of the acquired gesture; and
    determining, by the gesture device, whether the received gesture is supported by the gesture device,
        wherein when the gesture device determines that the received gesture is supported, determining and executing an instruction corresponding to the received gesture; and
        when the gesture device determines that the received gesture is not supported, forwarding, by the gesture device, the received gesture according to a preset strategy.

2. The gesture recognition method according to claim 1, wherein determining and executing an instruction corresponding to the received gesture comprises:
    receiving, by the gesture device, the instruction corresponding to the received gesture, and executing the received instruction.

3. The gesture recognition method according to claim 2, wherein the gesture comprises at least one of the following: a computer vision recognition gesture or a wearable device gesture.

4. The gesture recognition method according to claim 1, wherein publishing, by the gesture device, the information of gestures supported by the gesture device comprises:
    publishing, in the network, by the gesture device, the at least one of the list of the supported gestures or the list of the instructions corresponding to the supported gestures; or
    upon reception of a request message for querying a gesture recognition capability, publishing, in the network, by the gesture device, the at least one of the list of the supported gestures or the list of the instructions corresponding to the supported gestures.

5. The gesture recognition method according to claim 4, wherein the gesture comprises at least one of the following: a computer vision recognition gesture or a wearable device gesture.

6. The gesture recognition method according to claim 1, wherein the list of the supported gestures comprises at least one of the following information: gesture numbers, gesture text description information, or digital graphic information.

7. The gesture recognition method according to claim 6, wherein the gesture comprises at least one of the following: a computer vision recognition gesture or a wearable device gesture.

8. The gesture recognition method according to claim 1, wherein the gesture comprises at least one of the following: a computer vision recognition gesture or a wearable device gesture.

9. A non-transitory computer readable medium having stored therein computer executable instructions used for executing the gesture recognition method according to claim 1.

10. A gesture recognition method, applied to a gesture recognition control device positioned independently of one or more gesture devices, the one or more gesture devices supporting gesture control but not provided with a camera to support recognition of a gesture, comprising:
    obtaining, by the gesture recognition control device through a network, information of gestures supported by the one or more gesture devices, published by the one or more gesture devices in a form of a unicast, multicast or broadcast message;
    acquiring, by the gesture recognition control device, a gesture;
    determining, by the gesture recognition control device, a gesture device from the one or more gesture devices according to at least one of the following information: the information of gestures supported by the one or more gesture devices, a direction of the acquired gesture or intention information of the acquired gesture; and
    sending, by the gesture recognition control device, the acquired gesture to the determined gesture device so that the determined gesture device receives the acquired gesture and determines whether the received gesture is supported by the determined gesture device and whether to execute an instruction corresponding to the received gesture,
    wherein the information of gestures supported by the one or more gesture devices comprises at least one of a list of supported gestures or a list of instructions corresponding to supported gestures.

11. The gesture recognition method according to claim 10, further comprising:
    determining an instruction corresponding to the determined gesture device, and sending the determined instruction to the determined gesture device.

12. The gesture recognition method according to claim 10, wherein obtaining, by the gesture recognition control device through the network, the information of gestures supported by the one or more gesture devices comprises:
    obtaining, by the gesture recognition control device through the network, the at least one of the list of the supported gestures or the list of the instructions corresponding to the supported gestures, which is published by the one or more gesture devices; or
    sending, by the gesture recognition control device through the network, a gesture recognition capability request message to the one or more gesture devices, so as to receive the at least one of the list of the supported gestures or the list of the instructions corresponding to the supported gestures, which is published by the one or more gesture devices.

13. The gesture recognition method according to claim 10, wherein the list of the supported gestures comprises at least one of the following information: gesture numbers, gesture text description information, or digital graphic information.

14. The gesture recognition method according to claim 10, wherein the gesture comprises at least one of the following: a computer vision recognition gesture or a wearable device gesture.

15. A non-transitory computer readable medium having stored therein computer executable instructions used for executing the gesture recognition method according to claim 10.

* * * * *